United States Patent Office 3,775,491
Patented Nov. 27, 1973

3,775,491
PROCESSES FOR PRODUCING POLYCHLORINATED ETHANES AND POLYCHLORINATED ETHYLENES
Mareo Takenobu, Tokorozawa-shi, Takashi Yoshida, Iruma-gun, Saitama-ken, Hiroshi Masuda and Kenya Takahashi, Tokyo, and Kenji Fujioka, Kansuke Miura, Masuo Shibasaki, and Tetsuo Yamamoto, Iruma-gun, Saitama-ken, Japan, assignors to Central Glass Co., Ltd., Ube-shi, Yamaguchi-ken, Japan
Filed Aug. 23, 1968, Ser. No. 754,929
Claims priority, application Japan, Aug. 30, 1967, 42/55,263
Int. Cl. C07c 17/00, 21/10, 21/12
U.S. Cl. 260—654 D
22 Claims

ABSTRACT OF THE DISCLOSURE

Process for producing polychlorinated ethanes containing at least three chlorine atoms in the molecule or polychlorinated ethylenes at least two chlorine atoms in the molecule which comprises the continuous reaction steps of producing polychlorinated ethanes containing at least three chlorine atoms in the molecule by contacting chlorine with 1,2-dichloroethane in the presence of chlorinated ethylenes containing at least one chlorine atom, pyrolyzing the resultant mixture, and adding hydrogen chloride to the pyrolyzed mixture either as it is or after separation of trichloroethylene and tetrachloroethylene therefrom; the intended polychlorinated ethanes or ethylenes being recovered at one of these three steps.

---

This invention relates to processes for producing polychlorinated ethanes containing at least three chlorine atoms in their molecules as well as polychlorinated ethylenes containing at least two chlorine atoms in their molecules. More particularly, the invention relates in the first place to a process for producing polychlorinated ethanes containing at least three chlorine atoms in their molecules by contacting chlorine with 1,2-dichloroethane in the liquid phase in the presence of chlorinated ethylenes containing at least one chlorine atom. The present invention also relates to a process for producing polychlorinated ethylenes consisting predominantly of 1,1-dichloroethylene, cis- and trans-1,2-dichloroethylene, trichloroethylene and tetrachloroethylene by pyrolysis of a mixture of polychlorinated ethanes containing at least three chlorine atoms in their molecules, as obtained in the aforementioned chlorination reaction, the pyrolysis being carried out on the mixture of chlorinated products or the separated compound respectively. Further, the invention concerns a process for producing trichloroethylene and tetrachloroethylene as well as 1,1,1-trichloroethane concurrently in a continuous process by adding hydrogen chloride either to the mixture of chlorinated ethylenes obtained in the foregoing pyrolysis process or to the aforesaid mixture from which trichloroethylene and tetrachloroethylene has been separated and consisting predominantly of dichloroethylenes, in the liquid phase, to convert the 1,1 - dichloroethylene selectively to 1,1,1-trichloroethane and circulating to the chlorination step the remainder consisting predominantly of cis- and trans-1,2-dichloroethylene, which are recovered intact in an unreacted state.

The polychlorinated ethanes containing at least three chlorine atoms in their molecules and the polychlorinated ethylenes containing at least two chlorine atoms in their molecule, as produced herein, are in all cases valuable either as solvents or starting materials therefor. That is to say, 1,1,1-trichloroethane is widely used as a metal cleaning agent at room temperature and for other purposes, because of its essentially excellent dissolving power and safety, while trichloroethylene and tetrachloroethylene are also sold widely, respectively, mainly as a vaporous cleaning agent for metals and a solvent for dry cleaning, because of their excellent dissolving power. On the other hand, 1,1,2-trichloroethane, tetrachloroethane and pentachloroethane become respectively the starting materials of dichloroethylene, trichloroethylene and tetrachloroethylene by decomposition.

As methods of producing polychlorinated ethanes containing at least 3 chlorine atoms in their molecules, usually known are the methods of either carrying out the substitution chlorination reaction by contacting chlorine gas with such as a saturated hydrocarbon as ethane or chlorinated ethanes containing less than 3 chlorine atoms in their molecule, in the liquid phase under atmospheric pressure while irradiating with ultraviolet ray for accelerating the reaction, or raising the temperature of the reaction system under superatmospheric pressure while maintaining the system in its liquid state. However, both of these methods were accompanied by undesired side reactions, and particularly in the case of the method where irradiation with ultraviolet ray was practiced, there was the drawback that the reaction apparatus became complicated. Hence, it was not a commercially satisfactory method. Hence, 1,1,1 - trichloroethane is produced by adding hydrogen chloride to 1,1 - dichloroethylene using as a catalyst such as anhydrous iron [III] chloride (e.g. U.S.P. 3,065,2803. However, this method which is one wherein 1,2 - dichloroethane is first chlorinated to 1,1,2-trichloroethane, after which this is decomposed with such as milk of lime to form 1,1-dichloroethylene, followed by the addition of hydrogen chloride thereto has the drawback that the hydrogen chloride to be formed in the decomposition step forms a chloride with the metallic constituent in the decomposing agent to become fixed, making its recovery and utilization impossible. Hence, this method is not satisfactory as a commercial method.

As a method of producing chlorinated ethylene, particularly trichloroethylene and tetrachloroethylene, there is one which comprises obtaining a mixing of trichloroethylene and tetrachloroethylene by reacting 1,2-dichloroethane with chlorine in the vapor phase. In this method, however, the formation of tetrachloroethylene predominate usually, because of its stability in such reaction system. Hence, this method is exceedingly unsuitable when it is desired to produce trichloroethylene in large quantities. Tetrachloroethylene is also formed in a large quantity when a mixture of trichloroethylene and tetrachloroethylene is prepared by the thermal chlorination of hydrocarbons of 2 or 3 carbon atoms at temperatures exceeding 500° C. (e.g. U.S.P. 3,166,601). In addition, a chlorinolysis is set up in this case to form carbon tetrachloride as a by-product. Since carbon tetrachloride can be produced more advantageously by the conventional methods, the carbon tetrachloride formed as in this reaction must be considered as being a undesirable by-product which lowers the yield of the trichloroethylene and tetrachloroethylene.

On the other hand, when these two compounds are to be produced separately from each other, first, tetra- and pentachloroethane are respectively produced with a reaction process consisting of two or more stages, following which these are decomposed by means of an alkali or heat.

That is to say, as regards trichloroethylene, generally the decomposition of tetrachloroethane is employed, this tetrachloroethane being produced either by adding two molecules of chlorine to acetylene or by chlorinating in two stages the 1,2-dichloroethane obtained by the chlorinations of ethylene (e.g. Belgian Pat. No. 602,840).

On the other hand, as regards tetrachloroethylene, there is known a method which comprises adding one molecule of chlorine to trichloroethylene to yield pentachloroethane, which is then removed of its hydrogen chloride.

However, these methods are highly complicated and hence are not desirable as commercial methods.

Further, a method which can produce by a continuous series of manufacturing steps the polychlorinated ethanes and chlorinated ethylenes concurrently and advantageously has not been found to date.

It is therefore a primary object of the present invention to provide a process by which polychlorinated ethanes containing at least three chlorine atoms in their molecules and chlorinated ethylenes containing at least two chlorine atoms can be prepared commercially with advantage.

Another object is to provide a commercially advantageous process for producing polychlorinated ethanes containing at least three chlorine atoms in their molecules by chlorinating 1,2-dichloroethane.

A further object is to provide a process whereby two or more sorts of chlorinated ethylenes can be produced concurrently and advantageously.

An additional object is to provide a process which can produce trichloroethylene and tetrachloroethylene concurrently and in a desired proportion.

A further object is to provide a commercially advantageous process for producing 1,1,1-trichloroethane from 1,2-dichloroethane.

A still further object is to provide a process for advantageously producing 1,1,1-trichloroethane, trichloroethylene and tetrachloroethylene by means of a continuous serially arranged process.

Other objects and advantages of the present invention will become apparent from the following description.

These and other objects of the present invention are achieved by a process for producing polychlorinated ethanes containing at least three chlorine atoms in their molecules, which comprises contacting chlorine with 1,2-dichloroethane in the liquid phase in the presence of a chlorinated ethylene containing at least one chlorine atom in its molecule.

Unless otherwise noted, the percentages and parts used herein are on a weight basis.

This process was discovered on the basis of a new finding; namely, that the substitution chlorination reaction of 1,2-dichloroethane was accelerated markedly when, in producing chlorinated ethanes containing at least three chlorine atoms in their molecules by the substitution chlorination by contacting chlorine with 1,2-dichloroethane in the liquid phase, a chlorinated ethylene containing at least one chlorine atom in its molecule was caused to be present in the reaction system and its addition chlorination was caused to be carried out concurrently.

In short, in accordance with this process, since there is no necessity of irradiating the reaction system with ultraviolet ray or raising the temperature while maintaining the system in a liquid state under high pressure, neither are said side reactions set up nor is the reaction apparatus made complicated. In addition, the chlorinated ethylenes which are caused to be present together not only function merely to accelerate the reaction but also become converted to the intended product by the addition chlorination reaction. Hence, it becomes possible according to this process to produce commercially advantageously the intended polychlorinated ethanes containing at least three chlorine atoms in their molecules.

This process is represented by chemical formula: $CX_2=CXCl$ (where X is hydrogen or chlorine) which represents the chlorinated ethylenes containing at least one chlorine atom in its molecule and formula $$CX_2Cl-CXCl_2$$

(where X is the same as above) which represents the polychlorinated ethanes containing at least three chlorine atoms the molecule as follows:

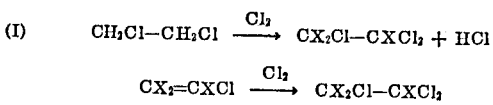

the substitution chlorination reaction of the starting 1,2-dichloroethane and the addition chlorination reaction of chlorinated ethylenes being effected concurrently to form the intended polychlorinated ethanes containing at least three chlorine atoms in their molecules and as by-product gaseous hydrogen chloride.

The products of this chlorination reaction have the formula $CX_2Cl-CXCl_2$ (where X is hydrogen or chlorine) and of these products those in which at least one of the X's is hydrogen are the intended products, namely, 1,1,2-trichloroethane, 1,1,2,2-tetrachloroethane and 1,1,1,2-tetrachloroethane and pentachloroethane.

The chlorinated ethylene containing at least one chlorine atom, as used in this chlorination reaction, are represented by the formula $CX_2=CXCl$ (where X is hydrogen or chlorine) and are chosen from monochloroethylene, 1,1 - dichloroethylene, trans- or cis-1,2-dichloroethylene, trichloroethylene, tetrachloroethylene, and mixture of at least two of these; and preferably monochloroethylene, 1,1 - dichloroethylene, trans- or cis-1,2-dichloroethylene, and mixtures of at least two of these. Particularly desirable are the dichloroethylenes, and when using 1,2-dichloroethylene, still more desirable results are obtained if appreciable amount of 1,1-dichloroethylene is coexisted. The amount of the 1,1-dichloroethylene is up to about 5% based on the total chlorinated ethylene.

The amount of the chlorinated ethylenes to be present together may be any amount so long as it is in a mole ratio of above 0.05 based on the 1,2-dichloroethane, but from the standpoint of economy, a mole ratio ranging from 0.05 to 1.0 is to be preferred. When the chlorinated ethylene is monochloroethylene, a mole ratio in the range from 0.1 to 0.6 is particularly desirable, and in this case 1,1,2-trichloroethane is formed chiefly. On the other hand, in the case where the chlorinated ethylene is either 1,1-dichloroethylene, trans- or cis-dichloroethylene or a mixture of two or more of these, especially effective results are obtained by carrying out the reaction with a mole ratio ranging between 0.05 and 1.0.

On the other hand, the substitution chlorination reaction of the 1,2-dichloroethane is accelerated still more effectively, if the chlorinated ethylene or the mixtures thereof are brought into contact with either oxygen or an oxygen-containing gas such as, say, air prior to the introduction into the reaction system by the use of a suitable means.

The chlorination reaction is carried out by feeding chlorine into liquid 1,2-dichloroethane and chlorinated ethylene at a temperature ranging between 20° C. and the boiling point of the reaction system and a pressure ranging from normal atmospheric pressure to a superatmospheric pressure up to about 20 atmospheres. At temperatures below 20° C. the decrease in the reaction rate is pronounced and hence it is not commercially useful. While there is no particular restriction as to the pressure and the reaction can be carried out under high pressures at still higher temperature, from the standpoint of the handling and construction, the upper limit is about 20 atmospheres.

While the amount of chlorine necessary for the chlorination will vary depending upon the apparatus and the intended product, it must be at least an amount that is necessary for adding chlorine to the chlorinated ethylene. For example, it must be an amount more than necessary to convert the 1,2-dichloroethylene to tetrachloroethane. The time required for the chlorination reaction similarly varies depending upon the apparatus and the intended product, but is a time which is sufficient for converting at least 10%, and preferably 30–95%, of the 1,2-dichloroethane to 1,1,2-trichloroethane.

While the reaction is further accelerated if it is carried out under irradiation by ultraviolet rays, on the other hand, side reactions also increase to result in an increase in pentachloroethane and hexachloroethane which contain a still greater number of chlorine atoms.

The chlorination reaction can be carried out by either the batch-wise or continuous method. When it is carried out by the batch-wise technique, it is carried out in the following manner. For example, a suitable vessel is charged with 1,2-dichloroethane and chlorinated ethylene, after which chlorine is introduced. Alternatively, the chlorinated ethylene can be introduced to the previously charged 1,2-dichloroethane at the same time the chlorine gas is being blown in. In this case, the reaction temperature is controlled by means of a suitable method, and, it is desirable to provide a suitable condenser at the top of the reactor for recovering components in the reaction system that are entrained with the resulted hydrogen chloride gas and the excess of the chlorine gas and escaping out of the system. On the other hand, when the continuous method is to be employed, a vertical tube or tower is filled with a product chlorinated ethane, following which 1,2-dichloroethane, chlorinated ethylene and chlorine gas are introduced from the bottom and the reaction product can be withdrawn continuously from an outlet provided at the top. In this case, the contact of reactant may be improved by using packing reactor with a suitable packing (e.g. Raschig ring), or the reaction temperature can be suitably regulated by a jacket or coiled pipes disposed inside the reactor. As in the case with the batch-wise method, in the continuous method it is desirable to provide a condenser at the top for recovery the reaction components which are entrained with the excess of the chlorine gas and the resulted hydrogen chloride gas which escape to the outside of the system. Alternatively, the liquid level can be maintained at a suitable height by adjusting the height of the reactor and the amount of the chlorine fed can be adjusted so that it is completely reacted by the time it reached the top of the liquid. In this case, the unreacted material remaining in the reaction liquid withdrawn can be separated be separated by a suitable separating means and be recycled to the reaction system to be again used.

The objects of the present invention are achieved by a process for obtaining chlorinated ethylenes which consist predominantly of 1,1-dichloroethylene, cis- and trans-1,2-dichloroethylenes, trichloroethylene and tetrachloroethylene, which comprises reacting chlorine with 1,2-dichloroethane in the liquid phase in the presence of a chlorinated ethylene selected from 1,1-dichloroethylene, cis- and trans-1,2-dichloroethylene and the mixtures of these, to form a mixture of polychlorinated ethanes containing at least three chlorine atoms in their molecules, followed by pyrolyzing this mixture as-obtained or after having suitably separated it.

This process is one in which the hereinbefore described process for producing polychlorinated ethanes and the process for producing chlorinated ethylene by the pyrolysis of polychlorinated ethanes have been combined.

Thus, in accordance with this process, the intended two or more sorts of chlorinated ethylenes can be produced concurrently and advantageously by just the two steps of first the chlorination of 1,2 - dichloroethylene and then pyrolysis. Further, by suitably controlling the rate of reaction of the 1,2-dichloroethane during the chlorination step, the trichloroethylene and tetrachloroethylene resulting from the pyrolysis can be produced concurrently and in a desired proportion. Moreover, the cis- and trans-1,2-dichloroethylenes which form during the pyrolysis and of little utility value can be cycled to the chlorination reaction to be advantageously used as the staring material for the production of the other chlorinated ethylenes of greater utility value.

The essential constitution of this process is expressed by means of chemical formulae as follows:

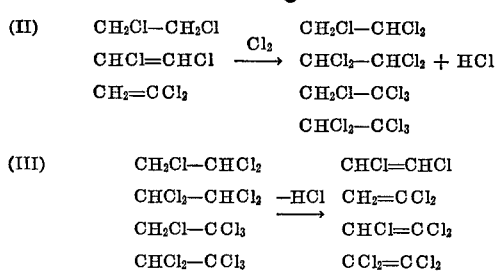

This reaction (II) is a liquid phase chlorination wherein the substitution chlorination of 1,2-dichloroethane and the addition chlorination of dichloroethylene (1,1-dichloroethylene and 1,2-dichloroethylene) are carried out concurrently. In consequence of conducting the former concurrently with the latter, the reaction rate of the former is accelerated tremendously and, in addition, the hydrogen chloride formed as a by-product is obtained in the gaseous state.

The reaction conditions of this chlorination reaction are as previously indicated.

In reaction (III), a pyrolytic reaction, the mixture formed in reaction (II) and consisting of polychlorinated ethanes containing at least three chlorine atoms in their molecules is, in its as obtained state or after being suitably separated, pyrolyzed to yield chlorinated ethylenes consisting predominantly of 1,1-dichloroethylene, cis- and trans - 1,2-dichloroethylenes, trichloroethylene and tetrachloroethylene.

This pyrolysis is usually carried out employing a stainless steel tubular reactor, at a temperature of 400–550° C. and at a pressure from normal atmospheric to 20 atmospheres without a catalyst. However, it can also be carried out using catalyst of such, for example, as active carbon supporting or not supporting a metal chloride such as barium chloride, etc. In this case, the reaction can be carried out at a temperature ranging between 200–350° C. Again, the known methods in which an accelerator such as oxygen, chlorine, bromine, carbon tetrachloride or hexachloroethane is added may also be employed. The presence of a small amount of chlorine gas is especially effective, its presence in a mole ratio of 0.1–5% based on the decomposed material being preferred. In conducting the pyrolysis, it is preferred to perform the separation in advance of the unreacted 1,2-dichloroethane, and hydrogen chloride formed in the reaction (II).

The pyrolysis can be carried out separately after suitably separating the mixture of polychlorinated ethanes containing at least three chlorine atoms in their molecules, into the respective components or groups of several components, or it can be carried out concurrently on the several components making up the mixture without separating the mixture into the several components. When the pyrolysis has been carried out with the as-obtained mixture, the intended products are obtained by separation of the decomposed mixture into the several components and purification of the separated components. In the case of 1,1,2-trichloroethane, its pyrolysis is accelerated by adding tetrachloroethane. When the decomposition is carried out concurrently, the proportion of the amounts decomposed of the several chlorinated ethanes in the mixture varies considerably depending upon the mixing ratio. Hence, the proportion of the amounts of chlorinated ethylenes can be varied by varying the mixing ratio of the starting material to be pyrolyzed. And in turn, the mixing ratio of the starting material can be varied by controlling the conversion of the chlorination reaction. According to our investigation, it was found that if the conversion of 1,2-dichloroethane in the chlorination reaction was so adjusted that it is on the order of 50%, the rate of formation of pentachloroethane would be very small and the tetrachloroethylene in the chlorinated ethylenes would be several percent, whereas as the conversion of 1,2-dichloroethane rises, the rate of formation of tetrachloroethylene increases. Thus, it becomes possible to optionally change the proportion of chlorinated ethylenes formed within a certain range by suitably controlling the conversion of the chlorination reaction.

The eliminated hydrogen chloride is separated in the gaseous form as a non-condensable component in the product and is combined with that resulting from the chlorination reaction of (II) to be used either in the next hydrogen chloride addition step or for other purposes such as oxychlorination.

One of the very important features of this process is that the cis- and trans-1,2-dichloroethylene of relatively small utility value are cycled to the chlorination step and are effectively used as the starting material of other valuable chlorinated ethylenes as well as an accelerator of the chlorination reaction. That is to say, of the products of the pyrolysis, the 1,1-dichloroethylene, trichloroethylene and tetrachloroethylene are isolated and purified to obtain the final products, whereas the remainder consisting predominantly of cis- and trans-1,2-dichloroethylene is cycled to the chlorination step. Further, particularly when the object is to obtain trichloroethylene and tetrachloroethylene, a part or all of the 1,1-dichloroethylene can also be cycled mixed together with the 1,2-dichloroethylenes to be used as the starting material. Thus, the desired chlorinated ethylenes can be produced very favorably commercially.

The objects of the present invention are also achieved by a process for producing 1,1,1-trichloroethane, which comprises contacting chlorine with 1,2-dichloroethane in the liquid phase in the presence of a chlorinated ethylene selected from 1,1-dichloroethylene, cis- and trans-1,2-dichloroethylenes, and mixtures of these, to form a mixture of polychlorinated ethanes containing at least three chlorine atoms in their molecules, pyrolyzing the as-obtained mixture to produce a mixture of chlorinated ethylenes consisting predominantly of 1,1-dichloroethylene, cis- and trans-1,2-dichloroethylenes, trichloroethylene and tetrachloroethylene, and thereafter adding hydrogen chloride in the liquid phase to this mixture or a dichloroethylene mixture consisting predominantly of dichloroethylenes which results after separation of trichloroethylene and tetrachloroethylene from the former mixture, to convert the 1,1-dichloroethylene selectively to 1,1,1-trichloroethane and, on the other hand, cycling to the chlorination step the remainder consisting predominantly of cis- and trans-1,2-dichloroethylenes recovered unreacted.

This process was discovered as a result of the ascertainment, in addition to the fact ascertained in discovering the previously described process, of the fact that when a mixture consisting of 1,1-dichloroethylene and cis- and trans-1,2-dichloroethylenes is reacted with hydrogen chloride in the liquid phase using a Friedel Crafts type catalyst such, for example, as anhydrous iron [III] chloride, hydrogen chloride becomes added selectively to only 1,1-dichloroethylene to form principally only 1,1,1-trichloroethane because the rate of addition of hydrogen chloride to cis- and trans-1,2-dichloroethylenes is very slow, and hence a major part of the cis- and trans-1,2-dichloroethylene are recovered in unreacted state, and of also broadly the fact that when hydrogen chloride is reacted under identical conditions with a chlorinated ethylene mixture containing trichloroethylene and tetrachloroethylene, as obtained by the pyrolysis reaction, the hydrogen chloride becomes added selectively to only 1,1-dichloroethylene to form principally only 1,1,1-trichloroethane, while a major part of the remaining chlorinated ethylenes are recovered unreacted.

Thus, in accordance with this method, in the process of obtaining 1,1,1-trichloroethane by adding hydrogen chloride to 1,1-dichloroethylene, the addition of the hydrogen chloride to either a mixture of 1,1-dichloroethylene and 1,2-dichloroethylene or a chlorinated ethylene mixture obtained by the pyrolysis step can be carried out directly and hence the complicated separation step can be simplified. Further, according to this process the hydrogen chloride gas which evolves in the pyrolytic reaction can be added to the 1,1-dichloroethylene in situ and thus it can be used advantageously. Again, according to this process, the cis- and trans-1,2-dichloroethylenes, which are recovered unreacted by the selective addition of hydrogen chloride to 1,1-dichloroethylene and of relatively small utility value, can by being cycled to the chlorination step, be used as the starting material of the intended trichloroethylene and tetrachloroethylene and also as a chlorination reaction accelerator.

Hence, trichloroethylene, tetrachloroethylene and 1,1,1-trichloroethane can be produced commercially advantageously by this process.

The essential constitution of this process, if shown by chemical formulae, is as follows:

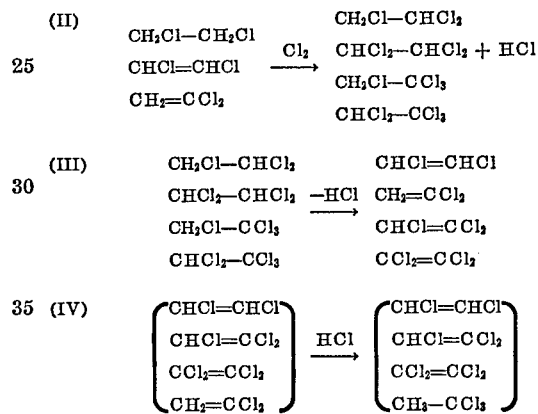

In the reactions shown, reaction (II) is a liquid phase chlorination wherein the substitution chlorination of 1,2-dichloroethane and the addition chlorination of dichloroethylenes (1,1-dichloroethylene and 1,2-dichloroethylene) are carried out concurrently. In consequence of conducting the former concurrently with the latter, the reaction rate of the former is accelerated tremendously and, in addition, the hydrogen chloride formed as a by-product is obtained in the gaseous state.

The reaction conditions of this chloroination reaction are as previously indicated.

In reaction (III), a pyrolytic reaction, the mixture formed in reaction (II) and consisting of polychlorinated ethanes containing at least three chlorine atoms in their molecules is, in its as-obtained mixture state, pyroylzed to yield a mixture of chlorinated ethylenes consisting predominantly of 1,1-dichloroethylene, cis- and trans-1,2-dichloroethylenes, trichloroethylene and tetrachloroethylene.

Equation IV represents a hydrogen chloride addition reaction. When hydrogen chloride is reacted with either the mixture of chlorinated ethylenes formed by the pyrolytic reaction (III) or this mixture from which trichloroethylene and tetrachloroethylene have been separated as products and consisting predominantly of 1,1-dichloroethylene and cis- and trans-1,2-dichloroethylene which remain, the hydrogen chloride becomes selectively added to 1,1-dichloroethylene to form 1,1,1-trichloroethylene while the remaining chlorinated ethylenes are recovered unreacted. These recovered unreacted chlorinated ethylenes are then recycled to the chlorination step after separation of trichloroethylene and tetrachloroethylene therefrom or without such separation.

The hydrogen chloride addition reaction is carried out in the liquid phase in the presence of a catalyst at a temperature ranging between about 10° C. to the boiling point of 1,1,1-trichloroethane, preferably 10–50° C., and a pressure from atmospheric to about 20 atms.

As the catalyst to be here used, effective are the compounds generally referred to as the Friedel-Crafts type catalyst such, for example, as anhydrous iron [III] chloride and aluminum chloride, and preferably anhydrous iron [III] chloride. The amount in which the catalyst is used is 0.05–5% by weight, and preferably 1.0–3.0% by weight based on the solvent. This amount exceeds the solubility in the reaction system in the case use is made of such, for example, as anhydrous iron [III] chloride with the result that a considerable amount remains in a suspended state as solids. Hence, in this case it is desirable to effect the dispersion of the catalyst as uniformly as possible in the system by means of forced circulation.

A solvent can be used in the reaction, and useable are such as the saturated chlorinated hydrocarbons as, for example, 1,1,1 - trichloroethane and 1,1,2-trichloroethane. For instance when 1,1,2 - trichloroethane is used, under atmospheric pressure a temperature exceeding 50° C. can be used, but in this case a slight tendency to acceleration of the hydrogen chloride addition reaction to trans-1,2-dichloroethylene appears. Further, there is required a solvent separation aftertreatment. Hence, it is preferred to use as the solvent the intended 1,1,1-trichloroethane.

It is necessary to use as the hydrogen chloride to be added one which is substantially anhydrous. That which is formed as a by-product in the hereinbefore described chlorination and pyrolysis reactions can be effectively used. And it must be used in an amount at least sufficient to convert the 1,1-dichloroethylene substantially to 1,1,1-trichloroethane. In the present invention, the conversion of the 1,1 - dichloroethylene to 1,1,1 - trichloroethane is preferably held within the range up to 95%, and thus it becomes possible to recycle the 1,1-dichloroethylene to the chlorination step of 1,2-dichloroethane in a desirable amount. The evolved gas leaving the pyrolysis reactor, in its mixed state can be introduced to the bottom of the hydrogen chloride addition reactor.

The hydrogen chloride addition reactor can be made of either glass or iron and either the batch-wise or continuous reactor can be employed. When the latter is used, the chlorinated ethylene and hydrogen chloride mixture are introduced from the bottom of the vertical reactor filled with 1,1,1-trichloroethane containing, say, anhydrous iron [III] chloride as catalyst, and the liquid reaction product liquid is caused to flow out from a withdrawal outlet provided at the upper part of the reactor. In this case, the temperature of the reaction system can be maintained at a desired state either by regulating the amount of liquid which is circulated under force from the bottom of the reactor to the upper part thereof via a cooling means provided externally of the reactor or by the provision of a coiled pipe inside the reactor. This operation is also effective in improving the state of dispersion of the catalyst.

The effluent from the upper part of the reactor is first separated of hydrogen chloride, and the solid catalyst which sink to the bottom in the reaction liquid is either suitably or continuously withdrawn from the bottom of the reactor along with the liquid and preferably recycled to the top of the reactor. The liquid collected is fractionated into that to be collected as a product and that to be recycled to the chlorination reaction. That is to say, when the hydrogen chloride addition has been carried out on a mixture of 1,1-dichloroethylene and 1,2-dichloroethylene, the liquid is fractionated into 1,1,1-trichloroethane and unreacted 1,2-dichloroethylene and the latter is recycled to the chlorination reaction. On the other hand, when the hydrogen chloride addition has been carried out on a chlorinated etthylene mixture as obtained from the pyrolysis reaction, the liquid is fractionated into 1,1,1-trichloroethane and the unreacted chlorinated ethylene mixture, the chlorinated ethylene mixture being either recycled to the chlorination step or fractionated into 1,2 - dichloroethylene, trichloroethylene and tetrachloroethylene, after which only the 1,2-dichloroethylene is recycled to the chlorination reaction.

The instance where 1,1,1 - trichloroethane as well as trichloroethylene and tetrachloroethylene is produced concurrently in accordance with the present invention will now be described with reference to the accompanying drawing.

Figure 1:
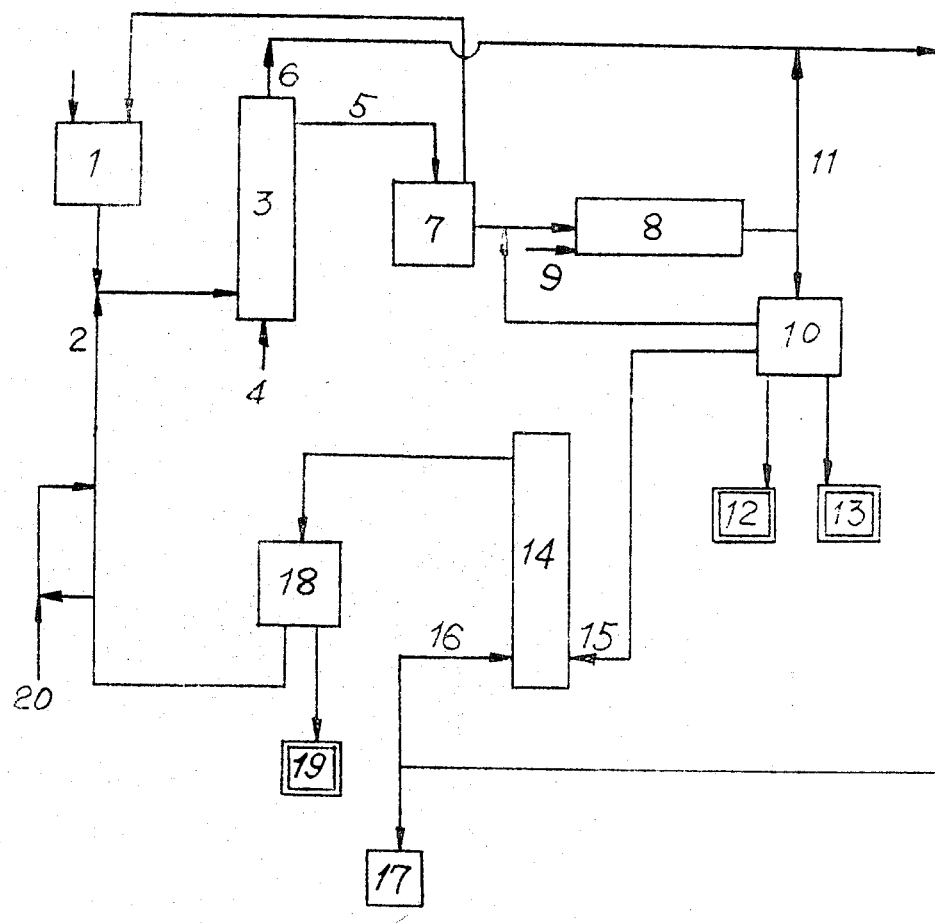
FIG. 1 and FIG. 2 are flow charts illustrating the general production steps in carrying out the concurrent productions of 1,1,1-trichloroethane as well as trichloroethylene and tetrachloroethylene.
Figure 2:
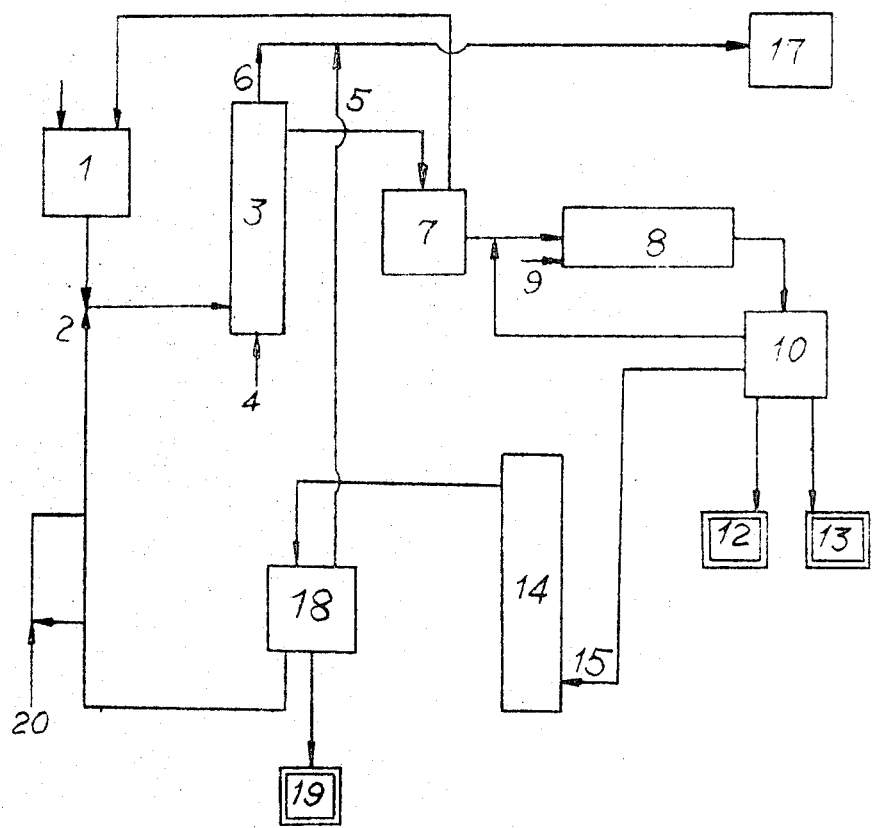

The starting material 1,2-dichloroethane fed to a storage tank combines with dichloroethylene (consisting predominantly of cis- and trans-1,2-isomers and including a small quantity of 1,1-isomer) fed via a pipe 2 and thereafter is introduced into a reactor 3, where the reaction in accordance with the aforesaid reaction (II) is carried out with chlorine delivered via a pipe 4 to yield a liquid product consisting of 1,1,2-trichloroethane, tetrachloroethane, pentachloroethane and unreacted 1,2-dichloroethane. This product is then withdrawn via pipe 5 and, after water-washing and fractionating at a purifying apparatus 7, the unreacted material is recycled to the storage tank 1 while the 1,1,2-trichloroethane, tetrachloroethane and pentachloroethane are conducted to a pyrolysis reactor 8 and decomposed. For ensuring that the reaction is still more effectively carried out, a small quantity of chlorine gas is added to the pyrolysis reactor 8 via a pipe 9. The gaseous product coming out of the reactor 8 contains principally 1,1-dichloroethylene, cis- and trans-1,2-dichloroethylenes, trichloroethylene, tetrachloroethylene, and unreacted 1,1,2-trichloroethane, tetrachloroethane and pentachloroethane. After this product is cooled, condensed and fractionated at a condenser 10, the unreacted material is returned to the reactor 8 and recycled, whereas the trichloroethylene and tetrachloroethylene are withdrawn into tanks 12 and 13 to become the end product. Reference numeral 14 denotes the hydrogen chloride addition reactor, which is filled with 1,1,1-trichloroethane as the medium and to which is introduced dichloroethylene via a pipe 15 in a liquid state. In the process of FIG. 1, the hydrogen chloride withdrawn as a non-condensable product via a pipe 6 from the top of the chlorination reactor 3 is combined with that withdrawn via a pipe 11 from the pyrolytic reactor 8. A part of the combined hydrogen chloride is blown into the reactor 14 via a pipe 16 while the remainder is reserved in a storage tank 17 and then is fed to another step such, for example, as oxychlorination. In the process of FIG. 2, the hydrogen chloride prepared in the pyrolysis reactor 8 is, without being separated, introduced into the hydrogen chloride addition reactor 14 with dichloroethylene. The hydrogen chloride withdrawn as a non-condensable product from the top of the chlorination reactor 3 is combined with the excessive hydrogen chloride withdrawn from the hydrogen chloride addition reactor 14 and the combined hydrogen chloride is stocked in the storage tank 17. The effluent liquid from the reactor 14 consists of 1,1,1-trichloroethane, the reaction product, and unreacted dichloroethylene. After this effluent liquid is separated at 18, the 1,1,1-trichloroethylene is withdrawn to a storage tank 19 as the end product, whereas the unreacted dichloroethylenes, after receiving a contact treatment with oxygen or air fed from a pipe 20 or without such a treatment, are returned to the chlorination reactor 3 and recycled.

The following examples are given for further detailed illustration of the present invention.

EXAMPLE 1

This example is given by way of comparison and illustrates the instance where the chlorination of 1,2-dichloroethane is carried out in the absence of a chlorinated ethylene.

When a 4-necked cylindrical 300-cc. flask equipped with a stirrer, thermometer, condenser and gas inlet line was charged with one mole of 1,2-dichloroethane and, while maintaining a temperature of 70° C., chlorine gas was introduced thereinto for one hour at the rate of 500 cc. per minute the composition of the resulting reaction liquid was as follows:

| | Wt. percent |
|---|---|
| 1,2-dichloroethane (unreacted starting material) | 98.37 |
| 1,1,2-trichloroethane | 1.60 |
| Tetrachloroethane (1,1,2,2- and 1,1,1,2-) | 0.02 |
| Pentachloroethane | 0.01 |

EXAMPLE 2

A reactor as used in Example 1 was charged with one mole of 1,2-dichloroethane, and the reaction was carried out for one hour under identical conditions by blowing in chlorine gas at the rate of 500 cc. per minute and vinyl chloride at the rate of 100 cc. per minute. The resulting reaction liquid in this case was as follows:

| | Wt. percent |
|---|---|
| 1,2-dichloroethane (unreacted starting material) | 34.6 |
| Vinyl chloride (unreacted starting material) | Trace |
| 1,1,2-trichloroethane: | |
|   From vinyl chloride | 16.2 |
|   From 1,2-dichloroethane | 46.2 |
| Tetrachloroethane (1,1,2,2- and 1,1,1,2-) | 2.7 |

EXAMPLE 3

A reactor as used in Example 1 was charged with 2 moles of 1,2-dichloroethane and 0.5 mole of 1,2-dichloroethylene, the ratio of trans to cis of which was 1:2 and containing 4.59% by mol of 1,1-dichloroethylene). When the temperature was maintained at 60° C. and chlorine gas was introduced for 2 hours at the rate of 400 cc. per minute, the resulting reaction product had the following composition:

| | Wt. percent |
|---|---|
| 1,2-dichloroethane (unreacted starting material) | 22 |
| Trans- and cis - 1,2 - dichloroethylene (unreacted starting material) | Trace |
| 1,1,2-trichloroethane | 42.6 |
| Tetrachloroethane (1,1,2,2- and 1,1,1,2-) | 35.0 |

EXAMPLE 4

When the reactor as used in Example 1 was charged with 1.25 moles of 1,2-dichloroethane, followed by adding dropwise 1,2-dichloroethylene (the ratio of trans to cis of which was 2:1 and containing 2.76% by mole of 1,1-dichloroethylene) at the rate of 0.75 mole per hour and introducing at the same time chlorine gas at the rate of 500 ml. per minute, under identical conditions as in Example 2, the composition of the reaction product one hour later was as follows:

| | Wt. percent |
|---|---|
| 1,2-dichloroethane (unreacted starting material) | 33.7 |
| 1,2-dichloroethylene (trans- and cis-; unreacted starting material) | 0.3 |
| 1,1,2-trichloroethane | 21.3 |
| Tetrachloroethane (1,1,2,2- and 1,1,1,2-) | 43.8 |

EXAMPLE 5

The chlorination reaction was carried out employing a jacketed cylindrical vertical type chlorination reactor packed with Raschig rings and introducing from the lower part thereof a mixture consisting of 1,2-dichloroethane and dichloroethylene (predominantly cis- and trans-1,2-isomers and containing 5.76% by mol of 1,1-dichloroethylene) (78.0 wt. percent of 1,2-dichloroethane) at the rate of 13.6 kg. per hour while blowing in concurrently from a separately provided inlet at the lower part of the reactor chlorine gas at the rate of 36.2 liters per minute, the reaction temperature being adjusted at 60° C. by circulating hot water through the jacket. The liquid product flowing out from the upper part of the reactor was separated from the hydrogen chloride formed as a by-product, washed with water and distilled to separate the unreacted 1,2-dichloroethane. The so-obtained mixture of 1,1,2-trichloroethane, tetrachloroethane and pentachloroethane was combined with the unreacted product which was cycled from the pyrolytic reaction in its unreacted state, and the combined mixture was introduced to the pyrolytic reactor at the rate of 18.9 kg. per hour. The pyrolysis was carried out in a stainless steel reactor maintained at 450° C. by means of indirect heating employing a niter bath. The resulting reaction product was then cooled and condensed to separate the hydrogen chloride and thereafter distilled, thus obtaining the products of 1,1-dichloroethylene at the rate of 1.78 kg. per hour, trichloroethylene at the rate of 4.79 kg. per hour and tetrachloroethylene at the rate of 0.55 kg. per hour. The cis- and trans-1,2-dichloroethylene formed at the same time were cycled to the chlorination reaction step, while the unreacted chlorinated ethanes were recycled as the material to be decomposed.

EXAMPLE 6

The chlorination reaction was carried out employing the apparatus as used in Example 5 and introducing thereto a mixture of 1,2-dichloroethane and dichloroethylenes (predominantly cis- and trans-1,2-isomers and containing 3.58% by mol of 1,1-dichloroethylene) (79.0 wt. percent of 1,2-dichloroethane) at the rate of 15.7 kg. per hour and blowing in chlorine gas at the rate of 83.7 liters per minute, the reaction being carried out at 70° C. After separating the unreacted 1,2-dichloroethane, the resulting mixture of 1,1,2-trichloroethane, tetrachloroethane and pentachloroethane was combined with the unreacted matter cycled from the pyrolytic reaction and the combined mixture was introduced to the pyrolytic reactor at the rate of 34.5 kg. per hour. The pyrolysis was carried out at 450° C. with the result that a product consisting of 1,1-dichloroethylene at the rate of 1.53 kg. per hour, trichloroethylene at the rate of 81.9 kg. per hour and tetrachloroethylene at the rate of 5.53 per hour was obtained.

EXAMPLE 7

This example illustrates the selective addition of hydrogen chloride to 1,1-dichloroethylene in the hydrogen chloride addition reaction.

A 4-necked glass 200-ml. reactor was used, and a reaction liquid of the following composition was charged thereto along with 0.82 gram of anhydrous iron (III) chloride as catalyst. When the hydrogen chloride addition reaction was carried out by blowing in hydrogen chloride gas for 26 minutes at the rate of 500 ml. per minute while maintaining the temperature at 30° C., a product liquid of the following composition was obtained.

| Component | Reaction liquid (g.) | Product reaction liquid (g.) | Rate of reaction (mol percent) |
|---|---|---|---|
| 1,1-dichloroethylene | 13.05 | 0.99 | 92.5 |
| Cis- and trans-1,2-dichloroethylene | 8.72 | 8.64 | 1.0 |
| 1,1,1-trichloroethane | 103.2 | 119.7 | |
| 1,1,2-trichloroethane | 0 | 0.13 | |

It is apparent from the foregoing results that the cis- and trans-1,2-dichloroethylenes scarcely react at all and that only 1,1-dichloroethylene participates selectively in the hydrogen chloride addition reaction.

EXAMPLE 8

This example, as in the case with Example 7, also illustrate the selective addition of hydrogen chloride to 1,1-dichloroethylene.

The selective addition reaction was carried out at 40° C. in the presence of 1.0 mole percent of anhydrous ferric chloride in the same reactor as used in Example 7, by blowing in hydrogen chloride gas for 25 hours at the rate of 500 ml. per minute. The solution compositions before and after the reaction are as follows:

|  | Before reaction | After reaction |
| --- | --- | --- |
| 1,1-dichloroethylene | 22.8 | 0.3 |
| Cis-, trans-1,2-dichloroethylene | 39.1 | 39.2 |
| Trichloroethylene | 24.0 | 24.1 |
| Tetrachloroethylene | 14.1 | 14.2 |
| 1,1,1-trichloroethane |  | 22.1 |
| 1,1,2-trichloroethane |  | 0.03 |
| Tetrachloroethane |  | 0.05 |

This fact means that the selective addition of the hydrogen chloride to 1,1-dichloroethylene is carried out in the copresence of not only 1,2-dichloroethylene but also trichloroethylene and tetrachloroethylene.

EXAMPLE 9

This example illustrates the process for producing concurrently 1,1,1-trichloroethane, trichloroethylene and tetrachloroethylene in accordance with the flow chart of FIG. 1.

The chlorination was carried out by introducing 1,2-dichloroethane and dichloroethylene (containing 5.18% by mol of 1,1-dichloroethylene) to the chlorination reactor 3 at the rates of 21.2 kg. per hour and 6.14 kg. per hour, respectively, and concurrently blowing in chlorine gas at the rate of 115 l./min., the reaction being carried out at a temperature of 70° C.

The unreacted 1,2-dichloroethane in the effluent liquid withdrawn via 5 was separated by fractionation at 7 and recycled, while the product consisting predominantly of 1,1,2-trichloroethane and tetrachloroethane was combined with the unreacted substances cycled from 10 and thereafter the combined mixture was introduced to the pyrolytic reactor 8 at the rate of 57.8 kg. per hour. The composition of the inflowing liquid was 26.5 wt. percent 1,1,2-trichloroethane, 45.8 wt. percent tetrachloroethane and 27.7 wt. percent pentachloroethane.

The pyrolysis was carried out at 450° C. for a dwell time of 6.5 seconds. After separating the hydrogen chloride from the resulting porduct by cooling and condensing, the dichloroethylenes (including 61 wt. percent of cis- and trans-1,2-dichloroethylenes and 39 wt. percent of 1,1-dichloroethylene) were separated by fractionation, after which the remaining product was introduced to the hydrogen chloride addition reactor 14 via 15 at the rate 9.6 kg. per hour.

As a result of having returned the unreacted substances in the pyrolytic product to a point before the reaction 8 and recycling them in the system, 13.80 kg. per hour of trichloroethylene and 4.62 kg. per hour of tetrachloroethylene were obtained.

Reactor 14 for carring out the hydrogen chloride addition reaction contained principally 1,1,1-trichloroethane and cis- and trans-1,2-dichloroethylenes. When the reaction was carried out at 30° C. by blowing in hydrogen chloride at the rate of 12.3 l./min. in the presence of 1.5 mol percent of anhydrous iron [III] chloride, an effluent liquid resulted which, when separated of its unreacted dichloroethylenes by fractionation, yielded 4.75 kg. per hour of 1,1,1-trichloroethane.

Further, the hydrogen chloride formed at the chlorination reactor 3 and that formed at the pyrolytic reactor 8 were combined and, a part thereof was used in the addition reaction by feeding via 16 and the remainder was withdrawn to the outside of the system via 17 at the rate of 161 liters per minute. A part of the unreacted substances consisting predominantly of cis- and trans-1,2-dichloroethylenes was diverted at an intermediate point of the pipe 2 and brought into contact with air from 20, after which it was combined with the main stream and recycled to the chlorination reactor 3.

EXAMPLE 10

Figure 3:
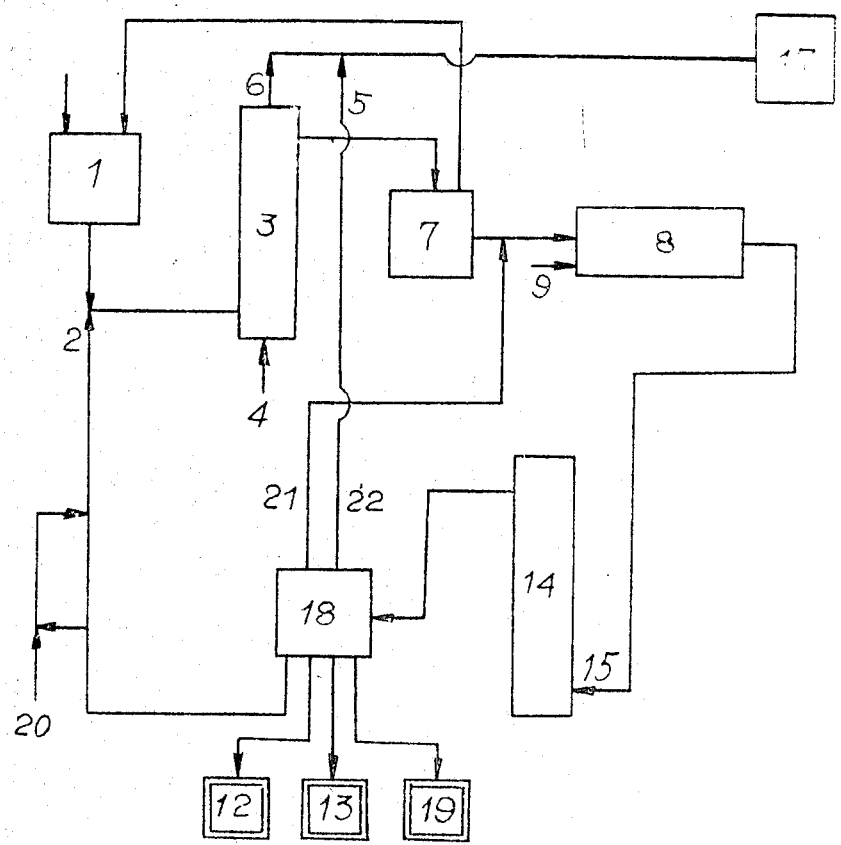
FIG. 3 is a flow chart illustrating the production steps in carrying out the concurrent productions of 1,1,1-trichloroethane as well as trichloroethylene and tetrachloroethylene in accordance with Example 10.

In accordance with the flow chart of FIG. 3, the chlorination reaction was carried out by introducing 1,2-dichloroethane and dichloroethylene (containing 7.5 mol of 1,1-dichloroethylene) in the chlorination reactor 3 as used in Example 9 at the rates of 24.8 kg. per hour and 6.57 kg. per hour, respectively, and concurrently blowing 167 liters per minute of chlorine gas, the reaction being carried out at a temperature of 70° C. The effluent liquid withdrawn via 5 was treated in the same manner as in Example 9, and the obtained liquid was combined with the unreacted substances cycled from the pipe line 21. Thereafter the combined mixture was introduced to the pyrolytic reactor 8 at the rate of 68.9 kg. per hour. The composition of the inflowing liquid was 19.9 wt. percent 1,1,2-trichloroethane, 38.0 wt. percent tetrachloroethane (1,1,2,2 and 1,1,1,2) and 42.1 wt. percent pentachloroethane. The pyrolysis was carried out at 450° C. for a contact time of 7.0 seconds. Dichloroethylene (containing 1,1-, cis- and trans-1,2-isomers), trichloroethylene, and tetrachloroethylene prepared from 1,1,2-trichloroethane, tetrachloroethane and pentachloroethane, respectively, were without being separated, introduced in the hydrogen chloride addition reactor 14 in a mixed state with eliminated hydrogen chloride. In the reactor 14 there were present the said pyrolysis products, undecomposed reactants, 1,1,1-trichloroethane and the like in a liquid state, and this liquid composition contained about 1.5 mol percent of anhydrous ferric chloride. The liquid was cooled by means of forced circulation in the outside cooler and was maintained at a temperature of 30° C. Anhydrous ferric chloride was effectively dispersed in the liquid and it accelerated the selective addition reaction of 1,1-dichloroethylene to hydrogen chloride. In the fractionation system 18, the excessive hydrogen chloride was separated from the effluent liquid from 14 and then the remaining liquid was combined with the liquid from 6 via pipe line 22. The combined liquid was withdrawn to the outside of the system via 17 at the rate of 13.6 cubic meters per hour. The separated dichloroethylenes were contacted with air and then recycled to the chlorination process. Thus, 4.21 kg. of 1,1,1-trichloroethane 16.4 kg. of trichloroethylene and 11.1 kg. of tetrachloroethylene were obtained per hour. The unreacted chlorinated ethanes were recycled to the pyrolytic reactor 8 via the pipe line 21.

We claim:

1. A process for producing trichloroethylene, tetrachloroethylene and 1,1,1-trichloroethane concurrently in a series of process steps comprising (1) contacting chlorine with 1,2-dichloroethane in the liquid phase in the presence of a chlorinated ethylene selected from the group consisting of 1,1-dichloroethylene, cis- and trans-1,2-dichloroethylenes and mixtures thereof, at a temperature within the range of from 20° C. to the boiling point of the reaction system and a pressure within the range of from normal pressure up to 20 atmospheres, in the absence of a chlorination catalyst, to form a mixture of polychlorinated ethanes containing at least three chlorine atoms in their molecules; (2) pyrolyzing said mixture of polychlorinated ethanes in situ to form a mixture of chlorinated ethylenes consisting predominantly of 1,1-dichloroethylene, cis- and trans-1,2-dichloroethylene, trichloroethylene and tetrachloroethylene and hydrogen chloride, (i) at a temperature of 400° to 550° C. in the absence of a catalyst, or (ii) at a temperature of 200° to 350° C. in the presence of a catalyst selected from active carbon and active carbon supporting barium chloride; (3) adding hydrogen chloride to said mixture of chlorinated ethylenes without separating hydrogen chloride from said mixture of chlorinated ethylenes in the liquid phase to convert the 1,1-dichloroethylene selectively to 1,1,1-trichloroethane, at a temperature of from about 10° C. to the boiling point of 1,1,1-trichloroethane and at a pressure of from atmospheric pressure to about 20 atmospheres in the presence of a Friedel-Crafts type catalyst and recovering said 1,1,1-trichloroethane; (4) separating the trichloroethylene and tetrachloroethylene from the remaining mixture of chlorinated ethylenes, which have been recovered unreacted; and (5) thereafter cycling the remainder of said mixture of chlorinated ethylenes to the chlorination reaction step.

2. The process of claim 1 wherein said chlorinated ethylene is 1,2-dichloroethylene containing up to about 5% of 1,1-dichloroethylene.

3. The process of claim 1 wherein said chlorinated ethylene is present in a mole ratio of at least 0.05 based on said 1,2-dichloroethane.

4. The process of claim 1 wherein in conducting said pyrolysis the unreacted 1,2-dichloroethane and hydrogen chloride are separated prior to the reaction.

5. The process of claim 1 wherein the addition of the hydrogen chloride is so controlled that the conversion of the 1,1-dichloroethylene to 1,1,1-trichloroethane is up to 95% and the unreacted, 1,1-dichloroethylene is cycled to the chlorination reaction step along with the cis- and trans-1,2-dichloroethylene.

6. The process of claim 1 wherein said hydrogen chloride addition is carried out in the presence of 0.5–5% by weight of Friedel-Crafts type catalyst.

7. The process of claim 1 wherein the hydrogen chloride addition is carried out using 1,1,1-trichloroethane as a solvent.

8. A process for producing trichloroethylene, tetrachloroethylene and 1,1,1-trichloroethane concurrently by means of a continuous method comprising (1) contacting chlorine with 1,2-dichloroethane in the liquid phase in the presence of a chlorinated ethylene selected from the group consisting of 1,1-dichloroethylene, cis- and trans-1,2-dichloroethylenes and mixtures thereof, at a temperature within the range of from 20° C. to the boiling point of the reaction system and a pressure within the range of from normal pressure up to 20 atmospheres, in the absence of a chlorination catalyst, to form a mixture of polychlorinated ethanes containing at least three chlorine atoms in their molecules; (2) pyrolyzing said mixture of polychlorinated ethanes in situ to form a mixture of chlorinated ethylenes consisting predominantly of 1,1-dichloroethylene, cis- and trans-1,2-dichloroethylene, trichloroethylene and tetrachloroethylene and hydrogen chloride, (i) at a temperautre of 400° to 550° C. in the absence of a catalyst, or (ii) at a temperature of 200° to 350° C. in the presence of a catalyst selected from active carbon and active carbon supporting barium chloride: (3) separating the trichloroethylene and tetrachloroethylene from said mixture of chlorinated ethylenes; (4) adding hydrogen chloride to said mixture of chlorinated ethylenes without separating hydrogen chloride from said mixture of chlorinated ethylenes in the liquid phase to convert the 1,1-dichloroethylene selectively to 1,1,1-trichloroethane, at a temperature of from about 10° C. to the boiling point of 1,1,1-trichloroethane and at a pressure of from atmospheric pressure to about 20 atmospheres in the presence of a Friedel-Crafts type catalyst and recovering said 1,1,1-trichloroethane; and (5) cycling to the chlorination reaction step the remainder of said mixture of chlorinated ethylenes consisting predominantly cis- and trans-1,2-dichloroethylenes which have been recovered unreacted.

9. The process of claim 8 wherein the addition of the hydrogen chloride is so controlled that the conversion of the 1,1-dichloroethylene to 1,1,1-trichloroethane is up to 95% and the unreacted 1,1-dichloroethylene is cycled to the chlorination reaction step along with the cis- and trans-1,2-dichloroethylene.

10. The process of claim 8 wherein said hydrogen chloride addition is carried out in the presence of 0.5–5% by weight of a Friedel-Crafts type catalyst.

11. The process of claim 8 wherein the hydrogen chloride addition is carried out using 1,1,1-trichloroethane as a solvent.

12. The process of claim 8 wherein said chlorinated ethylene is 1,2-dichloroethylene containing up to about 5% of 1,1-dichloroethylene.

13. The process of claim 8 wherein said chlorinated ethylene is present in a mole ratio of at least 0.05 based on said 1,2-dichloroethane.

14. The process of claim 8 wherein in conducting said pyrolysis the unreacted 1,2-dichloroethane and hydrogen chloride are separated prior to the reaction.

15. A process for producing trichloroethylene, tetrachloroethylene and 1,1,1-trichloroethane concurrently by means of a continuous method comprising (1) contacting chlorine with 1,2-dichloroethane in the liquid phase in the presence of a chlorinated ethylene selected from the group consisting of 1,1-dichloroethylene, cis- and trans-1,2-dichloroethylenes and mixtures thereof, at a temperature within the range of from 20° C. to the boiling point of the reaction system and a pressure within the range of from normal pressure up to 20 atmospheres, in the absence of a chlorination catalyst, to form a mixture of polychlorinated ethanes containing at least three chlorine atoms in their molecules; (2) pyrolyzing said mixture of polychlorinated ethanes in situ to form a mixture of chlorinated ethylenes consisting predominantly of 1,1-dichloroethylene, cis- and trans-1,2-dichloroethylene, trichloroethylene and tetrachloroethylene and hydrogen chloride, (i) at a temperature of 400° to 550° C. in the absence of a catalyst, or (ii) at a temperature of 200° to 350° C. in the presence of a catalyst selected from active carbon and active carbon supporting barium chloride; (3) separating the trichloroethylene, tetrachloroethylene and hydrogen chloride from said mixture of chlorinated ethylenes; (4) adding hydrogen chloride to said mixture of chlorinated ethylenes in the liquid phase to convert the 1,1-dichloroethylene selectively to 1,1,1-trichloroethane, at a temperature of from about 10° C. to the boiling point of 1,1,1-trichloroethane and at a pressure of from atmospheric pressure to about 20 atmospheres in the presence of a Friedel-Crafts type catalyst and recovering said 1,1,1-trichloroethane; and (5) cycling to the chlorination reaction step the remainder of said mixture of chlorinated ethylenes consisting predominantly of cis- and trans-1,2-dichloroethylenes which have been recovered unreacted.

16. The process of claim 15 wherein the addition of the hydrogen chloride is so controlled that the conversion of the 1,1-dichloroethylene to 1,1,1-trichloroethane is up to 95% and the unreacted 1,1-dichloroethylene is cycled to the chlorination reaction step along with the cis- and trans-1,2-dichloroethylene.

17. The process of claim 15 wherein said hydrogen chloride addition is carried out in the presence of 0.5–5% by weight of a Friedel-Crafts type catalyst.

18. The process of claim 15 wherein the hydrogen chloride addition is carried out using 1,1,1-trichloroethane as a solvent.

19. The process of claim 15 wherein the added hydrogen chloride is that obtained in the chlorination step as well as that obtained in the pyrolysis step.

20. The process of claim 15 wherein said chlorinated ethylene is 1,2-dichloroethylene containing up to about 5% of 1,1-dichloroethylene.

21. The proces of claim 15 wherein said chlorinated ethylene is present in a mole ratio of at least 0.05 based on said 1,2-dichloroethane.

22. The process of claim 15 wherein in conducting said pyrolysis the unreacted 1,2-dichloroethane and hydrogen chloride are separated prior to the reaction.

References Cited

UNITED STATES PATENTS

| | | | |
|---|---|---|---|
| 1,921,879 | 8/1933 | Herrmann et al. | 260—654 D |
| 2,547,139 | 4/1951 | Randall | 260—658 R |
| 2,674,573 | 4/1954 | Crauland | 260—654 D |
| 3,065,280 | 11/1962 | Vogt | 260—658 |
| 2,068,772 | 1/1937 | Sixt | 260—658 C X |

FOREIGN PATENTS

| | | |
|---|---|---|
| 1,459,814 | 10/1966 | France. |
| 649,831 | 12/1964 | Belgium. |

OTHER REFERENCES

FMC Corp., Chemical Abstracts, vol. 65, Col. 20005 (1966).

LEON ZITVER, Primary Examiner

M. W. GLYNN, Assistant Examiner

U.S. Cl. X.R.

260—654 H, 658 R